Sept. 16, 1952 P. W. PENN 2,610,889
LIFTING TOOL
Filed Sept. 30, 1947
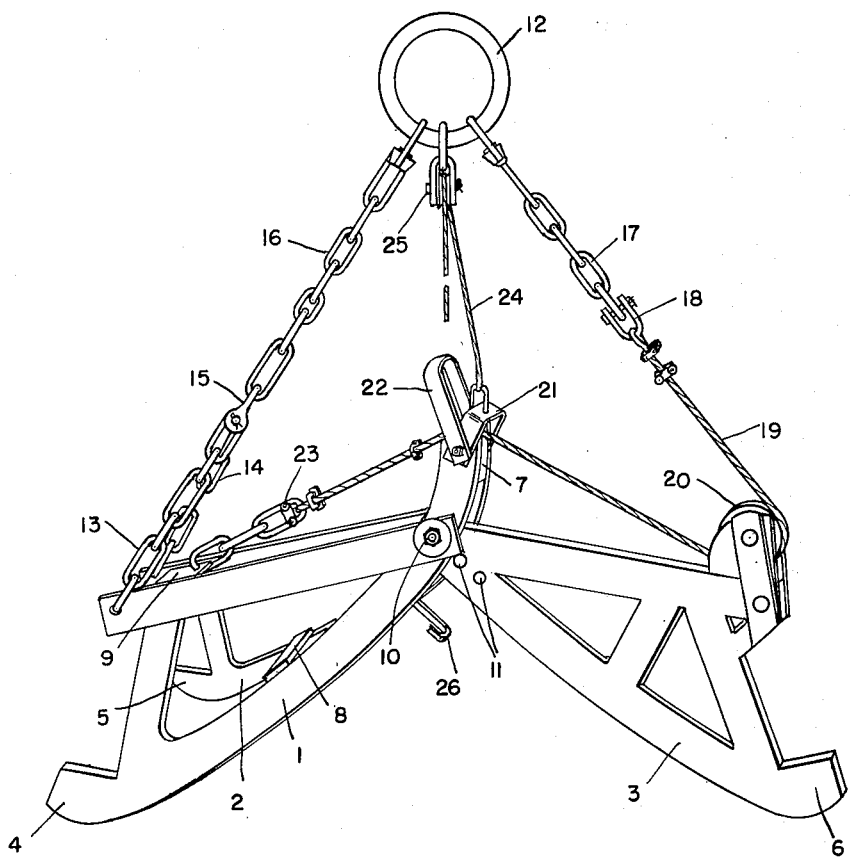
INVENTOR.
PENN W. PENN
BY
Oberlin & Limbach
ATTORNEYS Patented Sept. 16, 1952

2,610,889

UNITED STATES PATENT OFFICE 2,610,889

LIFTING TOOL

Penn W. Penn, Ravenna, Ohio

Application September 30, 1947, Serial No. 776,935

8 Claims. (Cl. 294—97)

This invention relates, as indicated, to lifting tools and more particularly to tools especially adapted for the lifting of tire molds, molding flasks, and like articles having a large central opening therein.

In the tire-making industry the rubber treads are ordinarily molded in large annular or "doughnut" shaped molds and the tires then vulcanized while still therein. These molds and mold-sections are very heavy in order to withstand the stresses and pressures to which they are subjected in use. They are usually transported from the machine shop to the molding machines, and to the vulcanizing chambers, by overhead cranes or the like, and the repeated handling of such heavy and clumsy objects causes much waste of time. On the other hand, no risk can be taken of dropping the same.

In the foundry it is frequently necessary to lift and transport empty mold flasks, as when the latter are to be carried to the machines to be filled with sand, lifted from the vibrator where the sand and castings are jarred therefrom, or stacked in storage when not in use. Since such flasks are ordinarily of metal and quite heavy, it is customary to employ an overhead crane or the like to handle them and a great many flasks may require to be handled in a single day. As a consequence, there has been a need for some device which could be quickly engaged with the flask to lift the same but which would also be positive in its action and unable accidentally to release the flask during its travel.

It is, therefore, a primary object of my invention to provide a lifting tool adapted quickly to engage a tire mold, molding flask, or similar object to raise the same, secure against accidental release.

Another object of my invention is to provide such tool adapted to enter an opening in the article to be lifted and to engage the latter by lateral expansion.

A further object is to provide such tool which will be automatically held in work-engaging position when lifted but which can be manually released without difficulty.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing, the figure illustrates one form of the device of my invention including means for controlling the operation thereof.

As above indicated, the ordinary tire mold is annular in form, having a rather large central opening. Similarly, molding flasks which may for example be either circular or rectangular in form are of box-like construction but without top or bottom walls so that when empty, the lifting tool may be inserted therein.

Referring now more particularly to said drawing, the embodiment of my invention there illustrated comprises three leg members 1, 2, and 3 terminating in prongs 4, 5, and 6, respectively. Legs 1 and 2 are joined at their upper end 7 and laterally spread by cross-braces 8 and 9. Such legs 1, 2, and 3 may each desirably be of welded frame construction. The upper end of leg member 3 is interposed between leg members 1 and 2 and pivotally connected therewith by means of pin 10. Additional pivot holes 11 are provided in member 3 to permit adjustment of such pivotal point, thereby varying the degree of lateral expansion of which the device is capable.

It will be seen from the foregoing that leg members 1 and 2 comprise a unitary structure, the prongs 4 and 5 of which are, however, laterally spaced. The device is suspended from a heavy ring 12 adapted to be engaged by the hook of an overhead crane or similar lifting means. Two chains 13 and 14, respectively secured to leg members 1 and 2, are joined by half-link 15 suspended from ring 12 by chain 16. The length of such suspension means may be adjusted by securing such half-link to any one of the links of chain 16 desired. Leg member 3 is suspended from ring 12 by means of chain 17 corresponding to chain 16, half-link 18, and a wire cable 19 which passes under a pulley 20 mounted on the upper frame portion of leg 3 and then over the joined upper ends 7 of leg members 1 and 2, beneath clevises 21 and 22. The end of such cable is secured to several chain links 23 attached to cross-brace 9.

From a consideration of the above-described arrangement, it will be readily apparent that the leg 3 will be required to swing inwardly or outwardly at all times equally with legs 1 and 2. A hand line 24 attached to clevis 21 passes over a small pulley 25 suspended from ring 12 whereby an operator may elevate the device relative to ring 12, thereby causing the legs to swing together.

thus collapsing the device. Clevis 22 is adapted to serve as a handle whereby the device may be manually lifted to collapse the same when desired. Spring catch 26 is provided on leg members 1 and 2 adapted to engage and releasably secure leg member 3 in such collapsed position. Such catch may then be manually disengaged when it is desired to again render the lifting device operative.

The operation of my new lifting tool will now be apparent. When employed to lift a tire mold, for example, resting on blocks on the floor, the tool will be lowered in collapsed position into the central opening of such mold and catch 26 released. The leg members will thereupon swing outwardly, the prongs 4, 5 and 6 thereof engaging the under surface of the mold. After transporting the mold to the desired location, the same will be lowered into place and the tool collapsed by pulling on cord 24 or manually lifting clevis 22.

By pivoting the third leg member between the other two rigidly connected legs a strong assembly is obtained reducing to a minimum the stresses to which the pivot pin will be subjected. The under surfaces of the prongs at the ends of the legs are desirably curved or rounded to facilitate spreading of the legs under the mere weight of the assembly when the same is lowered to the floor or other flat surface and the catch released. Instead of pulley 20 it is obvious that another form of eye or equivalent opening may be provided for passage of the flexible cable therethrough.

It will thus be seen that my new lifting tool as above described is positive in its operation yet quick and simple to use. No chains or other fastenings are required to be attached to the molds and the tool may be caused to engage or release such mold in a minimum of time.

Other modes of applying the principle of the invention may be employed, change being made as regards the details described, provided the features stated in any of the following claims or the equivalent of such be employed.

I therefore particularly point out and distinctly claim as my invention:

1. A mold lifting tool particularly adapted to lift molds of annular shape comprising two spaced leg members connected to form a rigid unit, a third leg member having an end interposed between said first two leg members and pivotally connected thereto, outwardly directed prongs on the ends of said legs spaced from such pivotal connection, said prongs being adapted to engage the under surface of an annular tire mold when said legs are inserted through such annular opening, catch means on said legs releasably operative to hold said third leg retracted toward said first two legs, a lifting ring, means connected to said first two legs at a point spaced from said pivot adapted to suspend said legs from said ring, a pulley on said third leg spaced from said pivot, an upstanding portion of said two-leg unit extending above such point of pivotal attachment, a cable attached to said ring passing around said pulley and over such point of pivotal attachment in engagement with such upstanding portion and adapted to bear downwardly thereagainst and secured to said other two-leg unit at a point spaced from said pivot toward the extended ends of said two-leg unit, a clevis secured to said leg assembly adjacent said pivot, a pulley suspended from said ring, and a line secured to said clevis and passing over said last-named pulley whereby such leg assembly may be elevated relative to said ring to cause such assembly to collapse.

2. A mold lifting tool particularly adapted to lift molds of annular shape comprising two spaced leg members connected to form a rigid unit, a third leg member having an end interposed between said first two leg members and pivotally connected thereto, the point of pivotal attachment on said third leg being adjustable longitudinally thereof, outwardly directed prongs on the ends of said legs spaced from such pivot, said prongs being adapted to engage the under surface of an annular mold when said legs are inserted through the annular opening therein, catch means on said legs releasably operative to hold said third leg retracted toward said first two legs, a lifting ring, longitudinally adjustable means connected to said first two legs at a point spaced from said pivot adapted to suspend said legs from said ring, means forming an eye on said third leg spaced from said pivot, an upstanding portion of one said leg extending above such point of pivotal attachment, longitudinally adjustable cable means attached to said ring passing through said eye and over such point of pivotal attachment in engagement with such upstanding portion and adapted to bear downwardly thereagainst and secured to said two-leg unit at a point spaced toward the extended ends of said two-leg unit from said pivot, and a clevis secured to said leg assembly adjacent said pivot, whereby such point of pivotal attachment of leg assembly may be elevated relative to said ring to cause such assembly to collapse.

3. A mold lifting tool particularly adapted to lift molds of annular shape comprising two spaced leg members joined to form a rigid unit, a third leg member having an end interposed between said first two leg members and pivotally connected thereto, outwardly directed prongs on the ends of said legs spaced from such pivotal connection, said prongs being adapted to engage the under surface of an annular mold when said legs are inserted through the opening in such annular mold, catch means on said legs releasably operative to hold said leg-assembly in closed position, a separate overhead support from which said assembly is adapted to be suspended, means connecting the outer portion of said two-leg unit to said support, means forming an eye on the outer portion of said third leg member, flexible suspension means connected to said support passing through said eye and over such point of pivotal attachment in engagement with such leg assembly and adapted to bear downwardly thereagainst and secured to the outer portion of said two-leg unit, whereby a lifting pull on said flexible suspension means will impart a downward force at such point of pivotal attachment of said legs tending to move the outer extremities of said legs outwardly, and means for elevating the central, pivotally connected portion of said assembly relative to said overhead support to cause said assembly to fold into closed position.

4. A lifting tool particularly adapted to lift molds of annular shape comprising two leg members closely joined at their inner ends and laterally spaced at their outer ends, said legs being connected to form a rigid unit, a third leg member having its inner end interposed between the inner end portions of said first two leg members and pivotally connected thereto to form a pivotally connected leg assembly, catch means on said legs releasably operative to hold said leg-assembly in collapsed position, a separate overhead support from which said assembly is adapted to be suspended, means connecting the outer portion of said two-leg unit to said support, means forming an eye on the outer portion of said third leg member, flexible suspension means connected to said support passing through said eye and over such point of pivotal connection in engagement with such leg assembly and adapted to bear downwardly thereagainst and secured to the outer portion of said two-leg unit, whereby a lifting pull on said flexible suspension means will impart a downward force at such point of pivotal attachment of said legs tending to move the outer extremities of said legs outwardly, and means for elevating the pivotally connected central portion of said assembly relative to said overhead support to cause said assembly to fold into collapsed position.

5. A lifting tool for lifting annular objects comprising two pivotally connected leg members, catch means releasably operative to hold said leg members in contracted position, supporting means from which said leg members are adapted to be suspended, means connecting the outer portion of one leg to said support, means forming an eye on the outer portion of the other said leg, flexible suspension means connected to said support passing through said eye and over such point of pivotal attachment in engagement with such leg assembly and adapted to bear downwardly thereagainst and secured to the outer portion of said first leg whereby a lifting pull on said flexible suspension means will impart a downward force at such point of pivotal attachment of said legs tending to move the outer extremities of said legs outwardly, and means for elevating the pivotally connected central portion of said leg assembly relative to said supporting means to cause said legs to fold into contracted position where they may be latched together by said catch means.

6. A lifting tool for lifting objects having an opening therethrough, such as annular tire molds and the like, comprising two pivotally connected leg members, supporting means from which said leg members are adapted to be suspended, means connecting the outer portion of one said leg to said support, an eye on the outer portion of the other said leg, flexible suspension means connected to said support passing through said eye and over such point of pivotal connection in engagement with such leg assembly and adapted to bear downwardly thereagainst and secured to the outer portion of said first leg, whereby a lifting pull on said flexible suspension means will impart a downward force at point of pivotal connection of said leg members tending to move the outer extremities of said leg members outwardly, and means for elevating the pivotally connected central portion of said leg assembly relative to said supporting means to cause said legs to fold into contracted position.

7. A lifting tool particularly adapted to lift objects having an opening therethrough, comprising two pivotally connected leg members, supporting means from which said members are adapted to be suspended, suspension means secured to one of said members at a point spaced outwardly from such point of pivotal connection and connecting said member to said supporting means for suspension therefrom, means forming an eye on the outer portion of the other said leg member, and flexible suspension means also secured to the same member at a point substantially spaced from such point of pivotal connection, said flexible suspension means passing over such point of pivotal connection in engagement with such leg assembly and adapted to bear downwardly thereagainst, then through such eye on the outer portion of the other said leg member, and secured to said supporting means, whereby a lifting pull on said flexible suspension means will impart a downward thrust on the central portion of such leg assembly tending to force the outer extremities of said legs outwardly.

8. A lifting tool particularly adapted to lift objects having a large opening therethrough, comprising two pivotally connected downwardly and outwardly inclined leg members, supporting means from which said members are adapted to be suspended, suspension means secured to one of said leg members near the outer end thereof and connecting said member to said supporting means for suspension therefrom, means forming an eye on the other said leg member near the outer end thereof, and flexible suspension means also secured to the same member near the point of attachment of said first-named suspension means and passing through such eye on the other said leg member near the outer end thereof and secured to said supporting means, said flexible suspension means engaging and adapted to bear downwardly against such leg assembly generally midway intermediate such eye and such point of attachment of said flexible suspension means to said one leg member, whereby a lifting pull on said flexible suspension means will impart a downward thrust on such central portion of such leg member assembly tending to spread the outer ends of said leg members further apart.

PENN W. PENN.

REFERENCES CITED

The following references are of record in the file of this patent:

UNITED STATES PATENTS

| Number | Name | Date |
| --- | --- | --- |
| 605,221 | David | June 7, 1898 |
| 2,370,482 | Morgan et al. | Feb. 27, 1945 |